United States Patent
Schindler et al.

(10) Patent No.: US 10,654,333 B2
(45) Date of Patent: May 19, 2020

(54) TRAJECTORY-BASED CHASSIS CONTROL

(71) Applicant: AUDI AG, Ingolstadt (DE)

(72) Inventors: Andreas Schindler, Ingolstadt (DE); Bodo Kleickmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 287 days.

(21) Appl. No.: 15/736,104

(22) PCT Filed: May 13, 2016

(86) PCT No.: PCT/EP2016/000796
§ 371 (c)(1),
(2) Date: Dec. 13, 2017

(87) PCT Pub. No.: WO2016/202419
PCT Pub. Date: Dec. 22, 2016

(65) Prior Publication Data
US 2018/0354334 A1 Dec. 13, 2018

(30) Foreign Application Priority Data

Jun. 16, 2015 (DE) .......................... 10 2015 007 592

(51) Int. Cl.
G06F 7/00 (2006.01)
B60G 17/0165 (2006.01)
(Continued)

(52) U.S. Cl.
CPC ....... B60G 17/0165 (2013.01); B60G 17/018 (2013.01); B60W 40/06 (2013.01);
(Continued)

(58) Field of Classification Search
CPC .............. B60G 17/0165; B60G 17/018; B60G 2800/704; B60G 2400/41; B60G 2401/16;
(Continued)

(56) References Cited

U.S. PATENT DOCUMENTS

| 10,347,127 B2* | 7/2019 | Droz ................ B60W 50/0098 |
| 2007/0021886 A1* | 1/2007 | Miyajima ............ B60G 17/019 701/37 |

(Continued)

FOREIGN PATENT DOCUMENTS

| CN | 1775601 A | 5/2006 |
| CN | 102292249 A | 12/2011 |

(Continued)

OTHER PUBLICATIONS

German Search Report dated Apr. 21, 2016 of corresponding German application No. 102015007592.6 ; 8 pgs.

(Continued)

*Primary Examiner* — Masud Ahmed
(74) *Attorney, Agent, or Firm* — Maier & Maier, PLLC

(57) ABSTRACT

A method for regulating an active chassis of a motor vehicle as a function of road elevation profile data which lie within a prognosis for a trajectory of the motor vehicle. The prognosis of the trajectory is calculated by a mathematical model at least on the basis of steering angle data of a steering angle sensor of the motor vehicle. The prognosis of the trajectory is assigned to the road elevation profile data detected by at least one environmental sensor. Based on the prognosis, at least one actuator of the active chassis is controlled, and the prognosis of the trajectory is then used exclusively to control the active chassis when the trajectory lies in an area that was classified as navigable based on the environmental data that was detected by at least one environment sensor.

5 Claims, 2 Drawing Sheets

(51) Int. Cl.
  *B60G 17/018* (2006.01)
  *G06K 9/00* (2006.01)
  *B60W 40/06* (2012.01)
(52) U.S. Cl.
  CPC ...... *G06K 9/00791* (2013.01); *B60G 2400/41* (2013.01); *B60G 2400/824* (2013.01); *B60G 2401/16* (2013.01); *B60G 2800/704* (2013.01)
(58) Field of Classification Search
  CPC ............ B60G 2400/824; B60W 40/06; B60W 2550/143; B60W 2420/42; G06K 9/00791
  See application file for complete search history.

(56) References Cited

U.S. PATENT DOCUMENTS

| | | | |
|---|---|---|---|
| 2010/0023211 A1 | 1/2010 | Ammon et al. | |
| 2010/0104199 A1 | 4/2010 | Zhang et al. | |
| 2011/0245995 A1 | 10/2011 | Schwarz | |
| 2013/0103259 A1* | 4/2013 | Eng | B60G 17/019 701/37 |
| 2013/0138318 A1* | 5/2013 | Choby | B60T 8/172 701/84 |
| 2014/0152432 A1 | 6/2014 | Zobel et al. | |
| 2014/0195112 A1 | 7/2014 | Lu et al. | |
| 2015/0224845 A1* | 8/2015 | Anderson | B60G 17/019 701/37 |
| 2016/0325753 A1* | 11/2016 | Stein | B60W 40/06 |

FOREIGN PATENT DOCUMENTS

| | | |
|---|---|---|
| CN | 103057376 A | 4/2013 |
| DE | 10133117 A1 | 1/2003 |
| DE | 102008028222 A1 | 12/2009 |
| DE | 102009033219 A1 | 7/2010 |
| DE | 102010018902 A1 | 11/2011 |
| DE | 102012004198 A1 | 10/2012 |
| DE | 102011109569 A1 | 2/2013 |
| DE | 102012101085 A1 | 8/2013 |
| DE | 102012009882 A1 | 11/2013 |
| DE | 102012015492 A1 | 2/2014 |
| DE | 102013016974 A1 | 3/2014 |
| DE | 102012112164 A1 | 6/2014 |
| EP | 2574958 A1 | 4/2013 |
| EP | 2713309 A2 | 4/2014 |
| KR | 10-2013-0003901 A | 1/2013 |
| KR | 10-2014-0053723 A | 5/2014 |

OTHER PUBLICATIONS

International Search Report dated Jun. 27, 2017 in corresponding Application No. PCT/EP2016/000796; 14 pgs.
International Preliminary Report on Patentability dated Dec. 28, 2017 in corresponding Application No. PCT/EP2016/000796; 8 pgs.
Korean Office Action dated Apr. 13, 2019, in connection with corresponding KR Application No. 10-2018-7001317 (9 pgs., including English translation).
Office Action dated Sep. 3, 2019, in corresponding Chinese Application No. 201680035032.2; 15 pages.
Office Action dated Mar. 12, 2020 in corresponding Chinese Application No. 201680035032.2; 18 pages including English-language translation.

* cited by examiner

TRAJECTORY-BASED CHASSIS CONTROL

FIELD

The present invention relates to a method for controlling an active chassis of a motor vehicle as a function of the road elevation profile data that lie within a prognosis of a trajectory of the motor vehicle. Furthermore, the present invention relates to a motor vehicle provided with a control device that is configured to carry out the proposed method.

BACKGROUND

In order to adjust predictive chassis systems, such as for example active suspension systems of a motor vehicle that will be travelling on the roadways in the future, the course of the road elevation profile in front of the vehicle is traditionally measured with an environment sensor system and processed to obtain an estimated road elevation profile signal. This road elevation profile signal is provided for a predictive chassis control of a user system, such as for example an active suspension system which calculates from this data a proactive actuation signal for respective actuators of the user system. By taking advantage of this prediction, based on a time advantage obtained in this manner by means of the environmental sensor system, for example the driving comfort can be increased, wherein the actuators are being precisely adjusted to each respective environment that is detected by the environment sensor system.

The road elevation signal is therefore needed for an actuation of the respective predictive controls by means of which the respective wheels of the vehicle are being driven, which means that road elevation signal is required for respective trajectories of the vehicle. Traditionally, the road elevation signal is based on a trajectory that is created by using currently known vehicle motion data, such as for example the steering angle, driving speed or acceleration. If the steering angle is not changed, the trajectory will be applied also in a near time window to the section of the road on which the vehicle is to be traveling.

However, if a respective driver carries out steering movements, the trajectory of the vehicle changes dynamically, so that the road elevation information may no longer be used on the basis of the data obtained from previous time windows, as this data is now outside of the range of the current trajectory. In this case, the deviation between the trajectory prediction and the actual trajectory of the vehicle will be increasing with the increasing distance of the predicted trajectory to the motor vehicle. The result of dynamic steering movements of the driver may be for example that the predicted trajectory will leave a current roadway and therefore it will leave the area of the road actually traveled.

In the German patent application DE 10 2012 015 492 A is disclosed a method for operating a chassis for a motor vehicle, wherein a road elevation profile is determined and associated with respective predetermined categories.

The US-American patent application U.S. 2010/0023211 A1 discloses a control system for a chassis of a vehicle, wherein a sensor measures the roadway ahead and based on the measurement data of the sensor, calculates a variable by means of which the actuators of the chassis are adjusted.

A method for operating an active chassis of a motor vehicle is disclosed in German patent application DE 10 2010 018 902 A1, wherein a road elevation profile signal is analyzed for periodically recurring elevation changes and actuators of the chassis are correspondingly adjusted as required.

SUMMARY OF THE DISCLOSURE

Against this background, a method for controlling an active chassis of a motor vehicle as a function of road elevation profile data, which lie within a prognosis of a trajectory of the vehicle is proposed, wherein the prognosis of the trajectory is calculated by means of a dynamic mathematical model at least on the basis of steering angle data of a steering angle sensor of the motor vehicle, and wherein the prognosis of the trajectory is associated with the respective road elevation profile data detected by at least one environment sensor, so that at least one actuator of the active chassis is controlled based on the prognosis, and wherein the prognosis of the trajectory is then used exclusively to control the active chassis when the trajectory lies in an area which was classified as navigable based on the environmental data that was detected by at least one environment sensor.

The proposed method is used in particular to control a chassis of a vehicle by means of environmental data detected by an environment sensor for a future trajectory of a vehicle, wherein the future trajectory of the vehicle is calculated by means of a mathematical model, which processes at least the steering data of the vehicle. In particular, it is provided that only trajectories that lie within an actually navigable area are used.

Environmental data are in the present invention to be understood as data originating from a measurement of a current environment of the vehicle, which are obtained by means of an environment sensor, such as for example a camera. Environmental data includes in particular road elevation information.

Road elevation profile data are in the present invention to be understood as such data that indicates a surface condition of each respective environment. In particular, it is provided that the road elevation profile data is derived from environmental data which was detected by an environment sensor.

By taking into account dynamic steering movements of the motor vehicle during the calculation of the prognosis of the trajectory of the motor vehicle, spontaneous steering maneuvers of a driver are taken into account, which in combination with a selective choice of corresponding environmental data enable a precise adjustment of the actuators of the chassis of the vehicle as a function of the environmental data and of the road elevation profile data corresponding to the actually traveled route section.

It is conceivable that the proposed method is carried out based on at least two different forecast horizons, wherein a first or shorter horizon is forecast on the basis of the steering angle data, in particular the current steering angle data, and a second forecast horizon, or a horizon that is located further away, is based on classified environment data.

In particular, it is provided that a prognosis horizon that is forecast on the basis of the steering angle data is combined with a prognosis horizon forecast on the basis of environmental data and a trajectory is calculated only on the basis of steering angle data in a specific area of the environment data.

A prognosis horizon is to be understood in the context of the present invention as a spatial distance of a boundary of a currently calculated prognosis, or of a trajectory of a respective vehicle.

In another possible embodiment of the proposed method, it is provided that the environmental data are used in order to detect, which is to say to classify, the lane on which the vehicle is currently travelling.

By means of environmental data, such as for example road elevation profile data, it is possible to identify a lane being currently traveled on and if necessary, to distinguish areas that cannot be traveled on, for example side strips. As soon as the corresponding knowledge about navigable areas is available, the calculations for controlling the active chassis of the motor vehicle can be limited to the environmental data relating to areas that are known to be navigable.

Furthermore, by selecting environmental data as a function of the lane being currently traveled on, it is possible to prevent the environmental data from exerting an influence on the prognosis to be calculated, or on the settings of the chassis, on the basis of the data that were determined for the areas that are not navigable.

In another possible embodiment of the proposed method it is provided that a surface profile is classified on the basis of the currently detected environmental data, in particular based on environmental data of a lane that is currently being traveled on by the vehicle.

In order to limit the trajectory of the vehicle to the areas that are likely to be traveled on and to increase the validity of the prognosis accordingly, it is conceivable to classify the currently detected data so that navigable areas, such as for example a street with a smooth surface, can be recognized and distinguished from non-navigable areas, such as for example rough side strips.

By using knowledge that is obtained with the classification of environmental data about the navigable areas lying ahead, potentially relevant environmental data can be further selectively and appropriately classified with more precisions, so that improper settings of actuators due to environmental data obtained from non-navigable areas can be avoided.

In another possible embodiment of the presented method it is provided that the classification of the environmental data, in particular of environmental data about the surface profile of the lane on which the vehicle is currently traveling and knowledge about the lane on which the vehicle is currently traveling is used in order to determine a prognosis about the respective trajectory by means of a validity index relating to the suitability of the data for controlling the active chassis.

As soon as respective environmental data is classified and relevant knowledge is available, for example in the form of a lane that is likely to be traveled on, it is possible to restrict the forecast of the vehicle's trajectory that is calculated based on the steering angle changes detected by the steering angle sensor to those areas of the environmental data that are in fact navigable. Accordingly, only the road elevation profile data that was classified as lying on the current lane and within the prognosis of the trajectory was calculated and used for controlling the active chassis.

It is conceivable that a validity index is used in order to determine the suitability of a respective calculated prognosis for a trajectory of a respective vehicle, which indicates the position of the calculated prognosis of the trajectory within a recognized lane or within a navigable area. For the validity index can be assumed for example a value between zero and one, wherein zero designates the position of the prognosis of the trajectory that is far from the navigable areas, and one designates a position that is directly on the respective lane.

A possible algorithm for carrying out the presented method can be created for example as described below:

a) detecting a lane currently being traveled on by means of environmental data that is detected by an environment sensor.
b) Classifying paved and unpaved road sections on the basis of the environmental data.
c) Estimating a future trajectory of the motor vehicle on the basis of information about the lane being currently traveled on and based on the knowledge about paved and unpaved sections described in the environmental data according to the results obtained in steps a) and b.
d) Assigning information detected by means of an environment sensor as road elevation information to the trajectory of the motor vehicle calculated for step c).
e) Limiting the trajectory prognosis on the basis of a current steering angle of the vehicle to areas on which traveling is in fact possible.

Furthermore, the present invention relates to a vehicle which is provided with a control unit and which is configured to control an active chassis of a vehicle as a function of street elevation profile data which lie in a trajectory of a motor vehicle, wherein the control device is further configured to calculate the prognosis by means of a dynamic mathematical model and to assign the prognosis of the trajectory to the street elevation profile data detected by the environmental sensor, wherein the prognosis of the trajectory is then used exclusively to control the active chassis when the trajectory lies in an area which is to be classified based on the environmental data as navigable.

Other advantages and embodiments of the invention will become evident from the description as well as from the attached figures.

It goes without saying that the features mentioned above and those that will be described below can be used not only in the particular indicated combinations, but also in other combinations or individually, without deviating from the scope of the present invention.

BRIEF DESCRIPTION OF THE DRAWING

The invention is schematically illustrated by means of embodiments in the drawings and it will be described with detail with reference to the drawings.

DETAILED DESCRIPTION OF THE DRAWING

Figure 1:
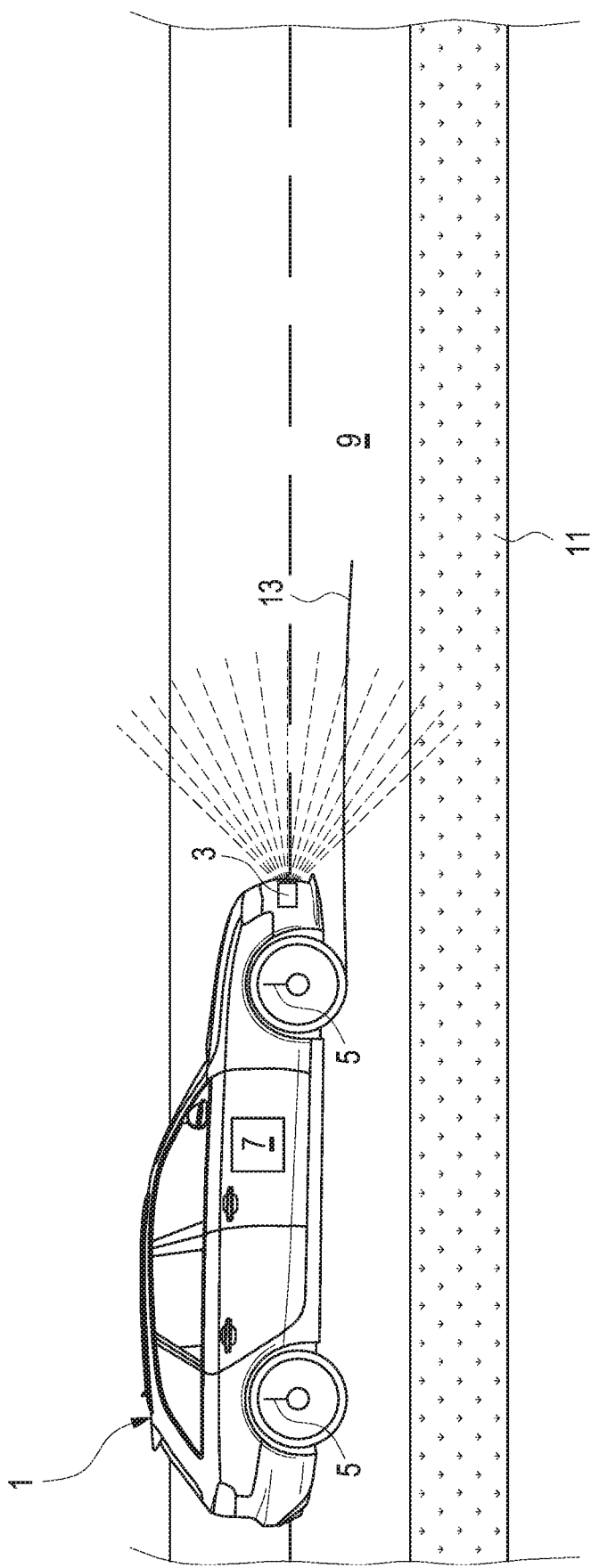
FIG. 1 shows a schematic development of a possible embodiment of the proposed method.
Figure 2:
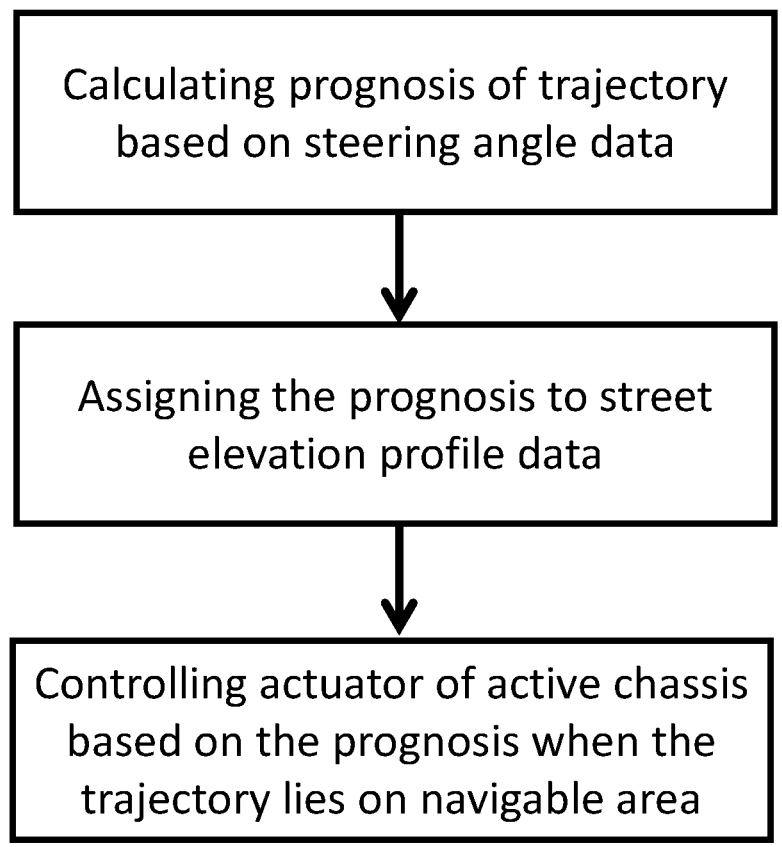
FIG. 2 shows an exemplary diagram of the proposed method.

FIG. 1 shows a motor vehicle 1 which is provided with an environmental sensor 3 in the form of a camera. The motor vehicle 1 further comprises actuators 5 for adjusting an active chassis of a motor vehicle 1, and a control device 7 which is configured to detect the steering movements of the motor vehicle 1.

In order to adjust the actuators 5 in a driving lane 9, the environmental sensor 3 detects an environment that is located in front of the vehicle 1, which is to say in particular the driving lane 9, as well as a side strip 11.

Based on the environmental data detected by means of the environmental detector 3, the driving lane 9 can be classified, for example by using a mathematical classifier which compares the environmental data to predetermined patters and which recognizes the driving lane 9 based on its surface structure, which is different from the side strips 11, as belonging to the "navigable" type.

As soon as the driving lane 9 is recognized, environmental data that correspond to the side stripes 11 are excluded from further analysis, so that further calculations are applied exclusively to the environmental data corresponding to the driving lane 9.

The control device 7 detects for example via a steering angle sensor the current steering angle as the steering angle of the motor vehicle 1, by means of which a trajectory 13 of the motor vehicle can be forecast, which is to say the waypoints to be traveled through in the future are calculated. In order to determine the trajectory 13 with respect to its validity, the trajectory 13 is then used exclusively for controlling the actuators 5 when the trajectory lies within the driving lane 9. For this purpose, for example the calculations for determining the prognosis of the trajectory 13 are limited to the environmental data which lie within the driving lane 9.

The invention claimed is:

1. A method for controlling an active chassis of a motor vehicle as a function of road elevation profile data which lie within a prognosis of a trajectory of a motor vehicle, comprising:

the prognosis of the trajectory is calculated by a dynamic mathematical model at least on the basis of steering angle data of a steering angle sensor of the motor vehicle, and the prognosis is assigned to street elevation profile data detected by at least one environment sensor, wherein based on the prognosis, at least one actuator of the active chassis is controlled, and wherein the prognosis of the trajectory is then used exclusively to control the active chassis when the trajectory lies in an area that was classified as navigable based on environmental data detected by at least one environment detector, wherein the environmental data are used in order to recognize a driving lane on which the vehicle is currently traveling, wherein a surface profile of the driving lane on which the vehicle is currently traveling is classified by currently detected environmental data, wherein a classification of a surface profiles of the driving lane on which the vehicle is currently traveling and knowledge about the lane being traveled on is used to determine a respective trajectory by a validation index regarding suitability of the driving lane for controlling the active chassis, and wherein a value of the validation index is zero or one, wherein zero designates a position of the prognosis of the trajectory outside from a navigable area, and one designates the position is on the navigable area.

2. The method according to claim 1, wherein the surface profile is classified as belonging to at least the following list of categories: paved and unpaved.

3. The method according to claim 1, wherein road elevation data information detected by the environment sensor is assigned to the trajectory prognosis.

4. The method according to claim 3, wherein a camera sensor is selected as the environment sensor supplying image data.

5. A motor vehicle provided with a control device including at least one processor and at least one memory operatively connected to the at least one processor, the control device is configured to control an active chassis of a motor vehicle as a function of road profile elevation data which lie within a prognosis of a trajectory of the motor vehicle, wherein the control device is further configured to calculate the prognosis by a dynamic mathematical model at least on the basis of the steering angle data of the motor vehicle and to assign the prognosis of the trajectory to the road elevation profile data that was detected by an environment sensor, wherein the prognosis of the trajectory is then used exclusively to control the active chassis, when the trajectory lies in an area which is classified as navigable based on environmental data, wherein the environmental data are used in order to recognize a driving lane on which the vehicle is currently traveling, wherein a surface profile of the driving lane on which the vehicle is currently traveling is classified by currently detected environmental data, wherein a classification of a surface profiles of the driving lane on which the vehicle is currently traveling and knowledge about the lane being traveled on is used to determine a respective trajectory by a validation index regarding suitability of the driving lane for controlling the active chassis, and wherein a value of the validation index is zero or one, wherein zero designates a position of the prognosis of the trajectory outside from a navigable area, and one designates the position is on the navigable area.

* * * * *